(12) United States Patent
Haseltine et al.

(10) Patent No.: US 10,847,017 B1
(45) Date of Patent: Nov. 24, 2020

(54) ELECTRONIC FACE MASK

(71) Applicant: Discovery Democracy LLC, Rancho Palos Verdes, CA (US)

(72) Inventors: Eric Haseltine, Rancho Palos Verdes, CA (US); Carl Hannigan, Cerritos, CA (US); Steven Thornton, Redondo Beach, CA (US)

(73) Assignee: Discovery Democracy LLC, Rancho Palos Verdes, CA (US)

( * ) Notice: Subject to any disclaimer, the term of this patent is extended or adjusted under 35 U.S.C. 154(b) by 0 days.

(21) Appl. No.: 16/877,906

(22) Filed: May 19, 2020

Related U.S. Application Data

(63) Continuation-in-part of application No. 16/834,698, filed on Mar. 30, 2020.

(60) Provisional application No. 62/990,762, filed on Mar. 17, 2020.

(51) Int. Cl.
| | |
|---|---|
| *G08B 21/24* | (2006.01) |
| *H04B 7/26* | (2006.01) |
| *H04B 1/7075* | (2011.01) |
| *H04B 11/00* | (2006.01) |

(52) U.S. Cl.
CPC ......... *G08B 21/245* (2013.01); *H04B 1/7075* (2013.01); *H04B 7/2668* (2013.01); *H04B 11/00* (2013.01)

(58) Field of Classification Search
None
See application file for complete search history.

(56) References Cited

U.S. PATENT DOCUMENTS

| | | | | |
|---|---|---|---|---|
| 2004/0113774 | A1* | 6/2004 | Wilson | G08B 21/0227 340/539.23 |
| 2012/0235826 | A1* | 9/2012 | Perry | G08B 21/0252 340/686.6 |
| 2015/0302716 | A1* | 10/2015 | Portalise | G08B 21/0283 340/539.13 |
| 2017/0103635 | A1* | 4/2017 | Kroll | G08B 21/0202 |
| 2018/0293873 | A1* | 10/2018 | Liu | G08B 21/245 |

* cited by examiner

*Primary Examiner* — Thomas S McCormack
(74) *Attorney, Agent, or Firm* — Cooley LLP

(57) ABSTRACT

In an embodiment, a processor is configured to randomly select one code from a plurality of predefined codes to identify a first code. A transceiver is operatively coupled to the processor. The transceiver is configured to send a signal representing the first code. The transceiver is also configured to receive a signal representing a second code. The processor is configured to determine whether the second code corresponds to the first code or a third code from the plurality of predefined codes. An actuator is operatively coupled to the processor. The actuator is configured to send a first alert in response to the second code corresponding to the first code and representing an object reflecting the signal representing the first code. The actuator is configured to send a second alert in response to the second code corresponding to the third code and representing a different device being within a predefined distance.

11 Claims, 6 Drawing Sheets

ELECTRONIC FACE MASK

CROSS-REFERENCE TO RELATED APPLICATIONS

This application is a continuation-in-part of U.S. patent application Ser. No. 16/834,698, filed Mar. 30, 2020, and entitled "Electronic Face Mask," which is a non-provisional of and claims priority under 35 U.S.C. § 119 to U.S. Provisional Application Ser. No. 62/990,762, filed Mar. 17, 2020, and entitled "Electronic Face Mask," the contents of which are incorporated herein by reference in its entirety.

BACKGROUND

In outbreaks of respiratory disease such as COVID-19, colds and flu, infection frequently occurs when individuals touch surfaces—such as door and shopping cart handles—that have pathogens on them from infected and contagious users sneezing, coughing or touching. When pathogens picked up on the fingers are carried to mucous membranes such as mouth, nose and eyes, infection from those pathogens can and does occur, because such mucous membranes are a route into the respiratory system. This mode of transmission is significant to the spread of disease because, according to recent research, the average person touches their face approximately 23 times per hour, often without being consciously aware of the touching. See Kwok, Y. et al., "Face Touching: A Frequent Habit that has Implications for Hand Hygiene", Am. J. Infect Control, February 2015, Vol. 43, Issue 2, pp. 112-114, which is incorporated herein by reference.

For example, a recent study indicated that the number of infections in an epidemic could be reduced 24%-69% if individuals practiced proper hand hygiene (frequent hand washing or use of hand sanitizers). See, Nicolaides, C. et al., "Hand-Hygiene Mitigation Strategies Against Global Disease Spreading through the Air Transportation Network," Risk Analysis, Dec. 23, 2019, pp. 1-18 which is incorporated herein by reference.

Another key challenge with disease outbreaks is for individuals to maintain safe distances—nominally about six feet-from each other. Data analytics company Unacast, using mobile position data to assess compliance with social distancing (https://www.unacast.com/covid19), discovered during the COVID-19 pandemic, that overall compliance with social distancing standards was poor in most parts of the United States. Thus any measure that helps groups and individuals comply with social distance norms would have benefit for slowing the spread of infectious disease spread by droplets exhaled during respiration.

Thus, a need exists to significantly reduce transmission of infectious disease by preventing individuals from touching their faces.

A further need exists to remind and alert individuals in a disease outbreak that they have approached another individual closer than a recommended social distance.

SUMMARY

In an embodiment, users are alerted that they are about to touch their face through an acoustic or haptic (cutaneous vibration) alarm that triggers whenever either hand gets into close proximity with the mouth, nose or eyes.

The proximity sensor is adjusted to reduce "nuisance" alarms when individuals put a phone to their ear or touch their hair.

In one embodiment, permanent magnets are worn in wrist bands on both hands, such that, when the distance between the wrist band magnets and a magnetometer worn at the base of front of the neck is less than a predefined (or predetermined) distance, and buzzer or vibratory alerts the individual in time for them to stop themselves from touching their mouth, nose or eyes.

Further, after repeated alerts, the process of operant conditioning, in which unconscious face touching is measured and "punished" via a buzzer or alert, will reduce hand-to-face touching, both voluntary and involuntary.

In yet another embodiment, a processor is configured to randomly select one code from a plurality of predefined codes to identify a first code. A transceiver is operatively coupled to the processor. The transceiver is configured to send a signal representing the first code. The transceiver is also configured to receive a signal representing a second code. The processor is configured to determine whether the second code corresponds to the first code or a third code from the plurality of predefined codes. An actuator is operatively coupled to the processor. The actuator is configured to send a first alert in response to the second code corresponding to the first code and representing an object reflecting the signal representing the first code. The actuator is configured to send a second alert in response to the second code corresponding to the third code and representing a different device being within a predefined distance.

DETAILED DESCRIPTION

Figure 1:
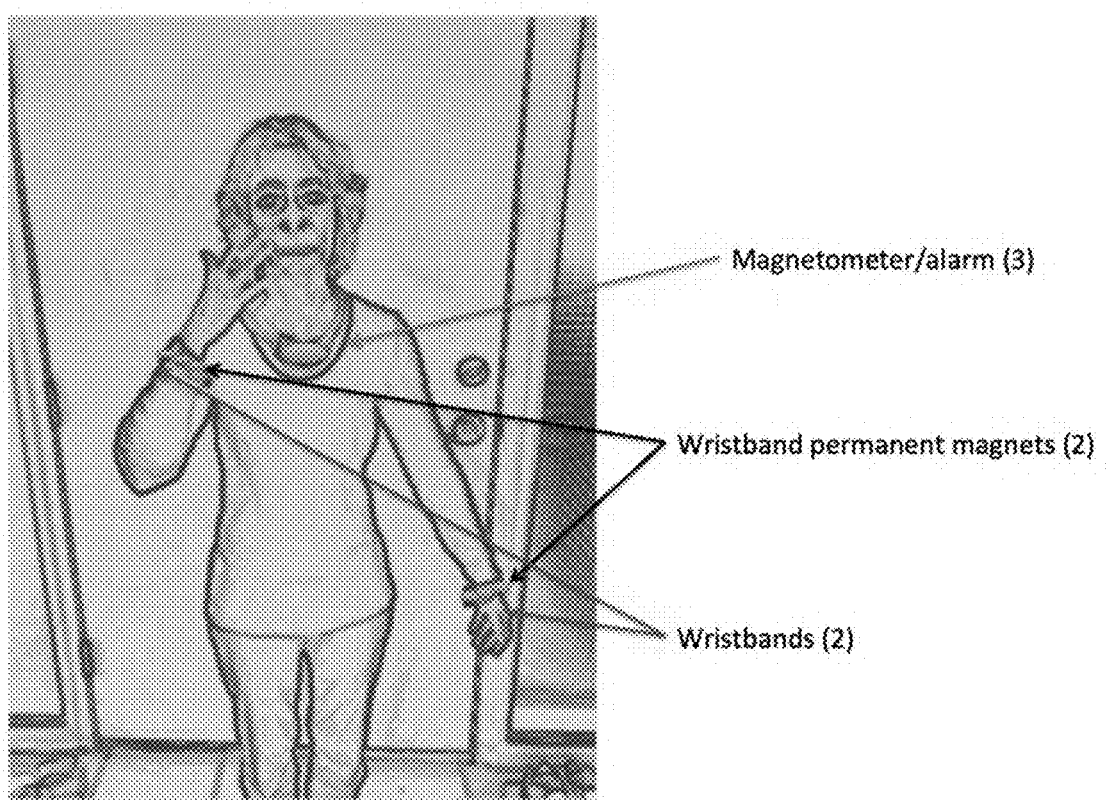
FIG. 1 shows a front view of an electronic mask system worn by a user, according to an embodiment.

As shown in the example of FIG. 1, permanent magnets (1) (an example of what is also referred to herein as "stimulators") embedded in wristbands (2) on both hands are positioned around the entire wristband so that activation of a magnetometer (3) (also referred to herein as a "proximity sensor") will occur whenever the hand approaches the proximity of the magnetometer in any orientation Although permanent magnets are often described herein as the stimulators embedded in the wristbands, it should be understood that other types of stimulators are possible such as light emitters (e.g., light emitting diodes (LEDs)) light reflectors and acoustic reflectors. Moreover, the stimulators are not limited to being embedded in wristbands, but alternatively can be disposed on or about a hand of a user such as a ring(s) worn on a finger(s) of the user.

Movement of the magnets produces a voltage in the magnetometer, E, where, $E = -d(\phi)/dt$, phi being the magnetic flux in the vicinity of an electrical conductor. The greater the change of flux (phi) per unit time, the greater the voltage in the conductor in the vicinity of that change.

The closer a moving magnet is to a conductor, such as wire wrapped in a coil, the larger the induced voltage and current in the conductor will be. Thus, for one or more embodiments, proximity of wrist magnets to a magnetometer worn at the base of the throat and neck can be sensed thorough increases in voltage in the magnetometer as the magnets move close to the magnetometer. In other words, the proximity sensor can be disposed proximate to the neck of the user, for example, around the neck of the user, or on or near the front or base of the neck or throat of the user such that the proximity sensor detects the stimulators when brought near the face of the user as described herein. The proximity sensor need not be only disposed proximate the neck or throat of the user, but could also be disposed at or proximate the face of the user, for example, as being included within a glasses frame worn by the user.

Figure 2:
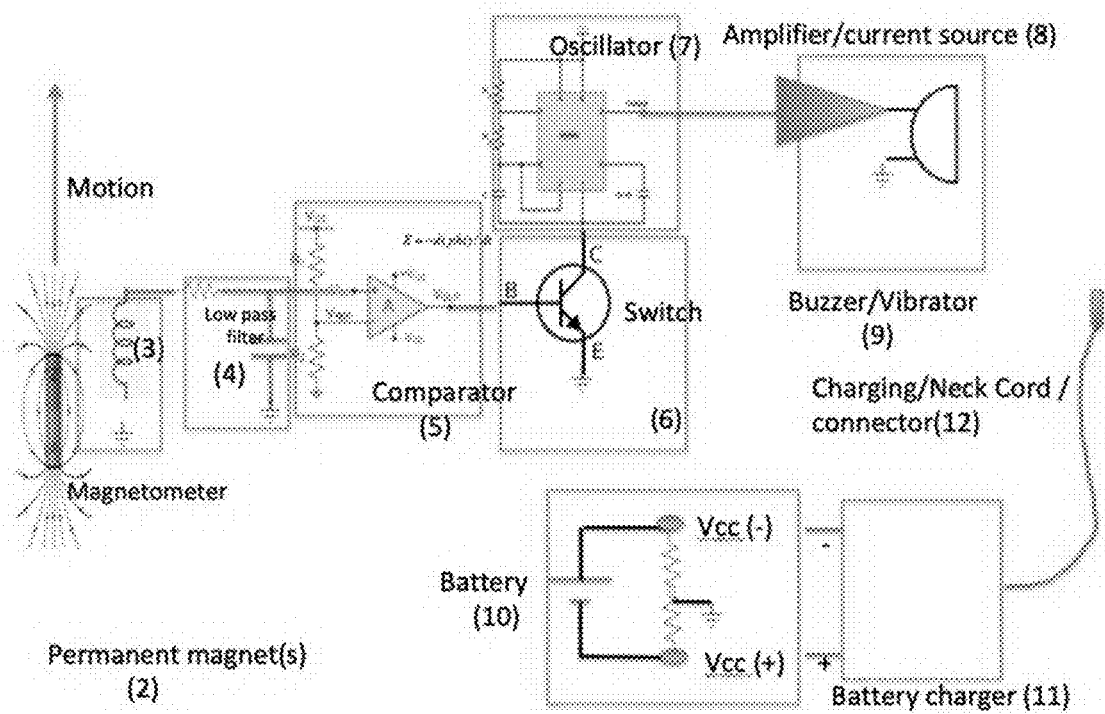
FIG. 2 shows a circuit diagram of an electronic mask system worn by a user, according to an embodiment.

As shown in FIG. 2, when permanent magnet (2) moves in the vicinity of magnetometer (3) a voltage and current develop in magnetometer (3). Low pass filter (4) removes high frequency noise from the magnetometer signal, before the signal is fed to comparator (5). The comparator is set up with a voltage divider network to the inverting input of the comparator, as shown, such that a reference voltage corresponding to the threshold signal for close proximity is established. The reference voltage can be, for example, predefined, preselected or predetermined. When the voltage in the filtered magnetometer signal exceeds the reference voltage, a discrete, nominally 5 Volt pulse is asserted at the output of the comparator.

This 5 Volt pulse drives the gate of a transistor switch (6), which in turn shunts power to an oscillator (7), which outputs a signal to an amplifier/current source (8) driving a buzzer/vibrator (9) (also referred to herein as an "actuator"), alerting the user that the magnetometer has received an above-threshold excitation signifying that one of the user's hands is approaching the face. In other the actuator can provide an output stimulus such as an acoustic output when the actuator is a buzzer (e.g., a piezoelectric device) or a haptic output (e.g., vibration output) when the actuator is a haptic actuator.

The magnetic strength of the permanent magnets, placement of the magnets and magnetometer, and threshold setting of the reference voltage to the magnetometer are set (predefined, predetermined or preselected) so that problematic touching of eyes, nose or mouth is alerted, but hand movements near the ears (such as those for holding a phone to the ear) or hair (for combing or adjusting the hair) are not.

In one embodiment a replaceable primary battery (10) powers the active components of the magnetometer assembly (5,6,7,8), with a voltage divider that establishes a neutral ground between + and −Vcc to power the comparator. In another embodiment, a battery charger (11) is added to the magnetometer assembly so that a rechargeable battery (such as Lithium Polymer, Nickel Cadmium or other rechargeable battery) can be used. In the embodiment with the rechargeable battery, the cord (12) that holds the magnetometer/alarm/battery charger assembly (3-9) is a shielded two conductor cord that has a female and male USB (A) connectors at either end (13 and 14), such that the neck cord clasp is implemented by the male connector being inserted into the female connector.

Figure 3:
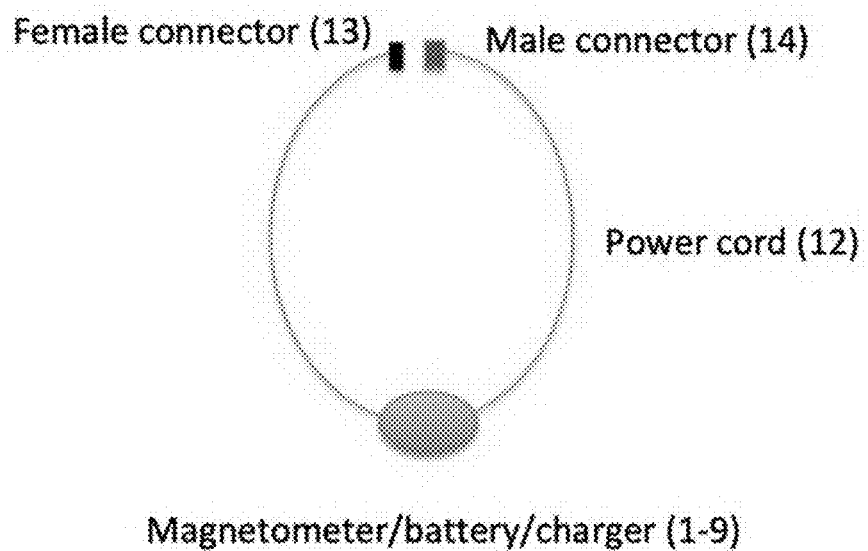
FIG. 3 shows the necklace power cord and female/male clasp connectors, according an embodiment.

FIG. 3 depicts the necklace power cord and female/male clasp connectors.

The battery charger in the magnetometer/alarm assembly (9) is energized when the USB (A) male connector is inserted into a standard USB powers source such as computer or wall phone charger. Other connector types, such as ⅛" mini audio-connectors are feasible as well.

The buzzer in the magnetometer/alarm assembly (9) can be set up to provide either an acoustic alarm, or more silent vibration that is felt only by the wearer, or both a vibration and audible alarm.

In one embodiment, the magnetometer comprises conducting wire, such as copper, wound multiple times around a flux-concentrating core (comprised of material with high magnetic permeability such as iron, mu metal or ferrite).

Alternative methods of and apparatus for detecting and alerting hand face proximity are feasible including:
1) Air core wire coil magnetometer;
2) Other types of magnetic sensors such as Hall effect magnetometers;
3) Optical proximity sensing from light emitters and photo sensitive receivers (i.e., the stimulator can be a light emitter and the proximity sensor can be a photo sensor or optical detector);
4) RFID systems where passive or active RFID tags worn on the wrist approach an interrogator worn around the neck;
5) Acoustic/Ultrasound proximity sensing where acoustic emitters worn on the wrists approach acoustic sensors worn around the neck; and
6) Proximity sensors where both emitters and receivers are worn around the neck and the hand/wrist serve as reflectors of optical or acoustic energy, the amount of which determines proximity to the hand.

Figure 4:
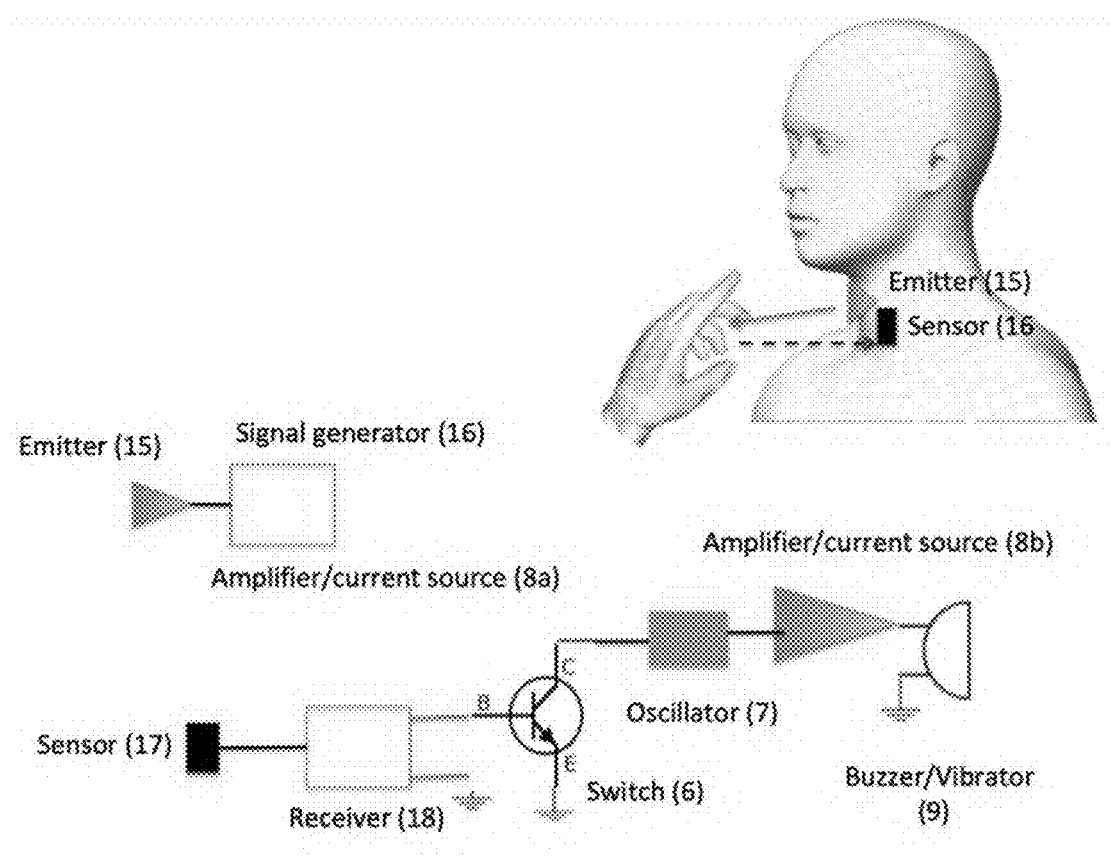
FIG. 4 shows a perspective view of an electronic mask system worn by a user and a related circuit diagram of the electronic mask system, according to an embodiment.

An example of a co-located emitter/receiver pairs that sense reflected energy from a hand near the face are shown in FIG. 4.

As shown in FIG. 4, an emitter and receiver are worn around the neck. Emitter energy from the emitter (15) carrying a modulated signal created by a signal generator (16) reflects off of an approaching hand and is received by a sensor (17), which turns on a switch (6), which in turn activates an oscillator (7), which in turn drives an amplifier (8b) and buzzer/vibrator (9).

When reflected energy exceeds a predefined (preselected or predefined) set threshold, the proximity sensor alerts the wearer of the emitter/receiver pair that a hand is close to the face.

In another embodiment of the transmitter/receiver proximity sensor (also referred to herein as a "proximity detection device"), each device is programmed to emit one of a plurality of codes, and to respond differently depending on whether the receiver detects a "self" code or "other code." When the device detects a "self" code, indicating that its own reflected energy has been received, it emits one type of alert, when it receives an "other" code through direct transmission, the device emits a different signal, signifying that another device with a different code is within reception range. In one or more embodiments, the transmitter and receiver radiate and receive energy (e.g., infrared (IR) energy modulated at 38 KHz, as used in IR remote controls; radio frequency (RF) energy; ultrasonic energy, etc.), providing 2048 or more unique codes to minimize confusion between reception "self" (reflected with near proximity) and "other" (directly received from remote device). Each device, upon power-up randomly selects one code from the domain of available codes, such that when that device receives the selected "self" code (also referred to herein as a "first code" when referring to one device, or a "first code" and a "third code" when referring to two devices), emits an alert that indicates a close proximity event, and when that device receives any other code, emits an "other" alert that indicates a proximity to a different device. For example, an alert that indicates a close proximity event can represent an object (e.g., a hand or other body portion of the user) near enough to reflect the "self" code such that the signal received by the device is strong enough that the device can detect the signal. An alert that indicates a proximity to a different device, for example, can represent a different device being within a predefined distance (e.g., within six feet).

Figure 5:
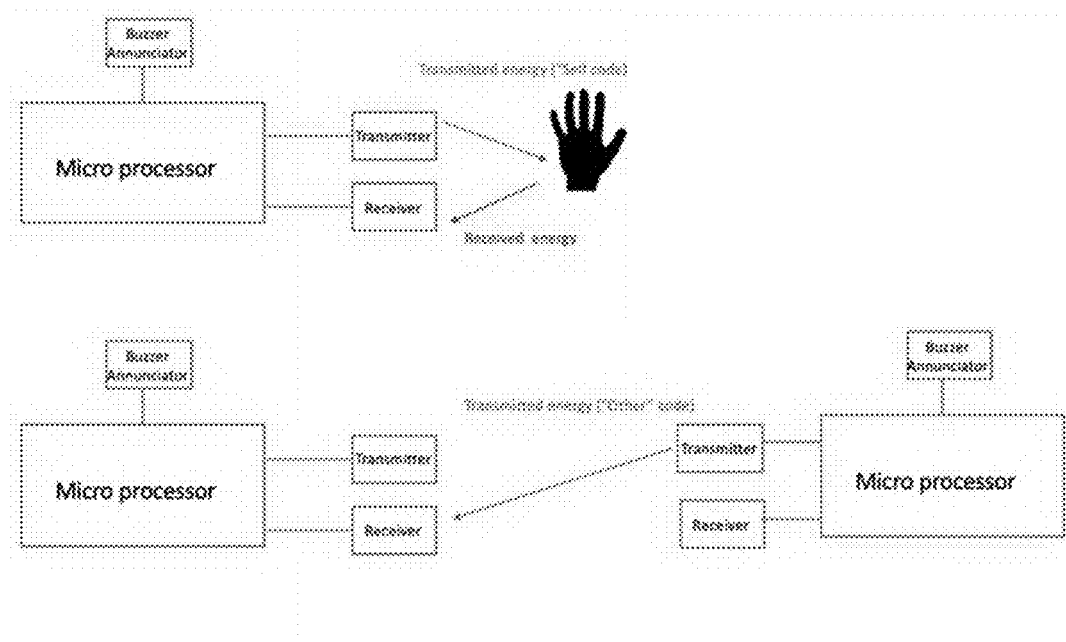
FIG. 5 depicts a device with a transceiver, a processor and an actuator for sending alerts interacting with an object and separately with another device, according to an embodiment.

FIG. 5 depicts a device with a transmitter/receiver (also referred to as a "transceiver") and an actuator (e.g., a buzzer annunciator programmed) such that when energy (or signal) carrying the reflected self-code is received, as from a hand in close proximity, a self-alert is sent from the actuator (e.g., radiated from the buzzer/annunciator), and when energy (or signal) carrying an "other" code is received directly from a device sending a signal representing a different code, an alternative alert issues from the actuator (e.g., buzzer/annunciator). In other words, the actuator can send a first alert in response to detecting a signal carrying the "self" code where the first alert represents an object reflecting the signal representing the "self" code. The actuator can send a second alert (different from the first alert) in response to detecting a signal carrying an "other" code, where the second alert represents a different device being within a predefined distance. The actuator can be a buzzer, vibrator, light transmitter (e.g., a light emitting diode (LED)).

Figure 6:
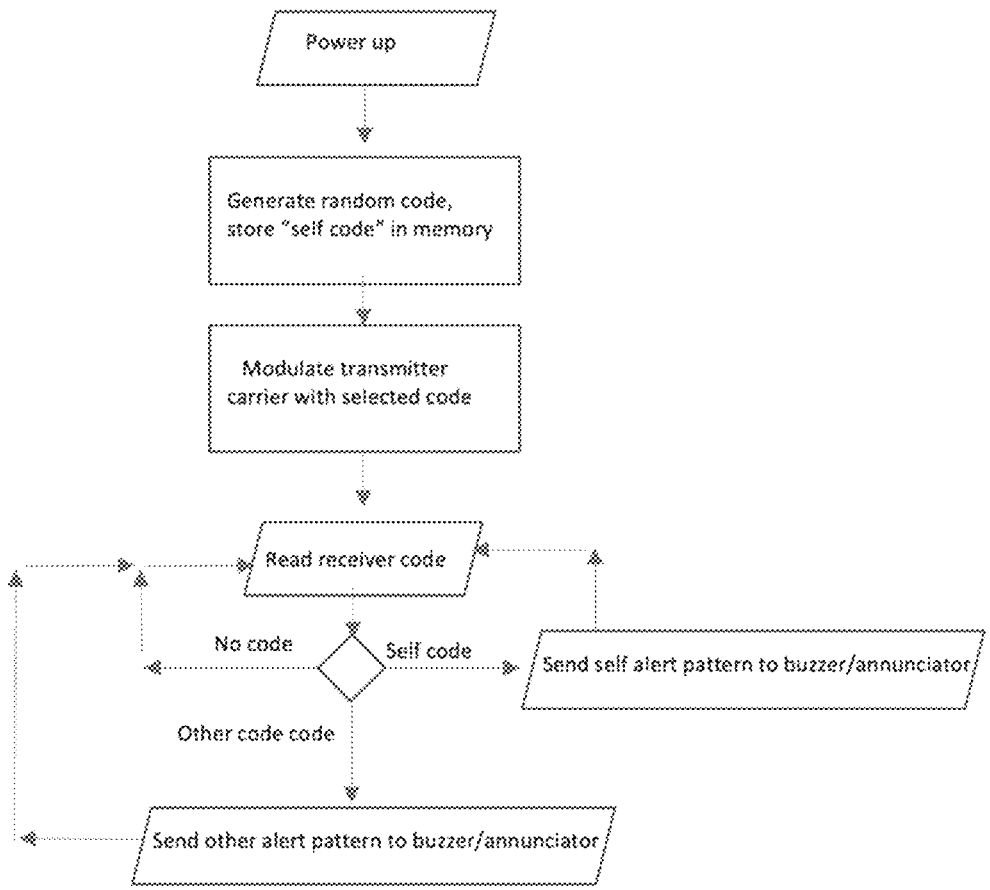
FIG. 6 shows a flowchart of an example method that can be executed by the processor of the device of FIG. 5.

FIG. 6 shows a flowchart that can be executed in the processor (e.g., a microprocessor) of the device. Upon power up, the processor randomly selects one code from the domain of possible codes (also referred to herein as a plurality or group of predefined codes), stores the selected one code in a memory operatively coupled to the processor. The processor then sends the selected one code to the transmitter for transmission. The processor continuously monitors the receiver (shown in loop) such that, when a self-code is received by the receiver, a "self" alert signal is sent from the processor to the actuator (e.g., a buzzer/annunciator) and when an "other" code is received, an "other" alert signal is sent from the processor to the actuator (e.g., the buzzer/annunciator).

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

What is claimed is:

1. An apparatus, comprising:
   a processor configured to randomly select one code from a plurality of predefined codes to identify a first code;
   a transceiver operatively coupled to the processor, the transceiver configured to send a signal representing the first code, the transceiver configured to receive a signal representing a second code,
      the processor configured to determine whether the second code corresponds to the first code or a third code from the plurality of predefined codes; and
   an actuator operatively coupled to the processor, the actuator configured to send a first alert in response to the second code corresponding to the first code and representing an object reflecting the signal representing the first code, the actuator configured to send a second alert in response to the second code corresponding to the third code and representing a different device being within a predefined distance.

2. The apparatus of claim 1, wherein the energy is ultrasonic energy.

3. The apparatus of claim 1, wherein the energy is radio frequency (RF) energy.

4. The apparatus of claim 1, wherein the plurality of predefined codes includes at least 2048 codes.

5. The apparatus of claim 1, wherein the predefined devices is approximately six feet.

6. A method, comprising:
randomly selecting, at a device and upon power up of the device, one code from a plurality of predefined codes to identify a first code;
sending, from the device, a signal representing the first code;
receiving, at the device, a signal representing a second code,
determining, at the device, whether the second code corresponds to the first code or a third code from the plurality of predefined codes;
sending, from the device, a first alert in response to the second code corresponding to the first code, the first alert representing an object reflecting the signal representing the first code; and
sending, from the device, a second alert in response to the second code corresponding to the third code, the second alter representing a different device being within a predefined distance.

7. The method of claim 6, wherein the energy is ultrasonic energy.

8. The method of claim 6, wherein the energy is radio frequency (RF) energy.

9. The method of claim 6, wherein the plurality of predefined codes includes at least 2048 codes.

10. The method of claim 6, wherein the predefined distance is approximately six feet.

11. A system, comprising:
a first proximity detection device having:
a processor configured to randomly select one code from a plurality of predefined codes to identify a first code, the plurality of predefined code including the first code and a third code;
a transceiver operatively coupled to the processor, the transceiver configured to send a signal representing the first code, the transceiver configured to receive a signal representing a second code,
the processor configured to determine whether the second code corresponds to the first code, the third code or any remaining code from the plurality of predefined codes; and
an actuator operatively coupled to the processor, the actuator configured to send a first alert in response to the second code corresponding to the first code and representing an object reflecting the signal representing the first code, the actuator configured to send a second alert in response to the second code corresponding to the third code or any remaining code from plurality of predefined codes and representing a different device being within a predefined distance; and
a second proximity detection device having:
a processor configured to randomly select one code from the plurality of predefined codes to identify the third code;
a transceiver operatively coupled to the processor of the second proximity detection device, the transceiver of the second proximity detection device configured to send the signal representing the third code, the transceiver of the second proximity detection device configured to receive a signal representing a fourth code,
the processor of the second proximity detection device configured to determine whether the fourth code corresponds to the third code, the first code or any remaining code from the plurality of predefined codes; and
an actuator operatively coupled to the processor of the second proximity detection device, the actuator of the second proximity detection device configured to send the first alert in response to the second code corresponding to the third code and representing an object reflecting the signal representing the third code, the actuator of the second proximity detection device configured to send a second alert in response to the second code corresponding to the first code or any remaining code from the plurality of predefined codes and representing a different device being within the predefined distance.

* * * * *